US012132266B2

(12) United States Patent
Park et al.

(10) Patent No.: US 12,132,266 B2
(45) Date of Patent: Oct. 29, 2024

(54) TERAHERTZ WIDEBAND ANTENNA AND METHOD OF DESIGNING THE SAME

(71) Applicant: ELECTRONICS AND TELECOMMUNICATIONS RESEARCH INSTITUTE, Daejeon (KR)

(72) Inventors: Bong Hyuk Park, Daejeon (KR); Sunwoo Kong, Daejeon (KR); Hui Dong Lee, Daejeon (KR); Seunghyun Jang, Daejeon (KR); Seok Bong Hyun, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 146 days.

(21) Appl. No.: 17/871,608

(22) Filed: Jul. 22, 2022

(65) Prior Publication Data

US 2023/0198144 A1 Jun. 22, 2023

(30) Foreign Application Priority Data

Dec. 20, 2021 (KR) ........................ 10-2021-0182795
Feb. 10, 2022 (KR) ........................ 10-2022-0017331

(51) Int. Cl.

*H01Q 3/28* (2006.01)
*H01Q 9/16* (2006.01)
*H01Q 21/06* (2006.01)

(52) U.S. Cl.

CPC ................. *H01Q 3/28* (2013.01); *H01Q 9/16* (2013.01); *H01Q 21/062* (2013.01)

(58) Field of Classification Search

CPC .......... H01Q 3/28; H01Q 9/16; H01Q 21/062; H01Q 9/285; H01Q 21/0075

See application file for complete search history.

(56) References Cited

U.S. PATENT DOCUMENTS

| | | | | |
|---|---|---|---|---|
| 8,957,441 | B2 | 2/2015 | Jun et al. | |
| 2008/0036668 | A1* | 2/2008 | White ...................... | H01Q 1/38 343/873 |
| 2010/0134372 | A1 | 6/2010 | Ryu et al. | |
| 2018/0219587 | A1 | 8/2018 | Huo | |
| 2021/0021052 | A1 | 1/2021 | Yu et al. | |

FOREIGN PATENT DOCUMENTS

| | | | | |
|---|---|---|---|---|
| KR | 20090093326 | A | * | 9/2009 |
| KR | 10-2017-0101310 | A | | 9/2017 |
| KR | 101971823 | B1 | | 4/2019 |
| KR | 10-2215275 | B1 | | 2/2021 |
| KR | 10-2264051 | B1 | | 6/2021 |
| KR | 20210117804 | A | * | 9/2021 |

* cited by examiner

*Primary Examiner* — Seokjin Kim
(74) *Attorney, Agent, or Firm* — Rabin & Berdo, P.C.

(57) ABSTRACT

Provided is a terahertz wideband antenna and a method for designing the same. According to various embodiments, the wideband antenna used for mobile communication in the terahertz wave communication band may include an antenna board including a first surface and a second surface opposite to the first surface, and a plurality of dipole antennas arranged on the antenna board, each of the plurality of dipole antennas may include a feeder disposed on the first surface and a radiator disposed on the second surface and physically spaced apart from the feeder, the feeder may be wire-bonded to a corresponding channel of a plurality of channels of a beam former, and the radiator may be coupled to the feeder to receive a signal from the feeder.

15 Claims, 3 Drawing Sheets

TERAHERTZ WIDEBAND ANTENNA AND METHOD OF DESIGNING THE SAME

CROSS-REFERENCE TO RELATED APPLICATIONS

This application claims the benefit from Korean Patent Application No. 10-2021-0182795 filed on Dec. 20, 2021, and Korean Patent Application No. 10-2022-0017331 filed on Feb. 10, 2022, in the Korean Intellectual Property Office, the entire disclosures of which are incorporated herein by reference for all purposes.

BACKGROUND

1. Field of the Invention

One or more example embodiments relate to a terahertz wideband antenna and a method of designing the same.

2. Description of the Related Art

Recently, with the development of wireless communication technology, a millimeter wave band 5G mobile communication system technology capable of transmitting large amounts of data using a wide frequency band per communication channel has been commercialized, and requests for a mobile communication system technology using the terahertz frequency band of 100 GHz or higher is a rapidly increasing trend. The millimeter wave band 5G mobile communication system has a frequency fractional bandwidth of about 11% with a bandwidth of 3 GHz, whereas a terahertz-based mobile communication system has a frequency fractional bandwidth of 15% with a bandwidth of 23 GHz.

Unlike an omni-antenna that radiates radio waves in all directions, a beam forming antenna is an antenna that may improve the performance of a wireless section by setting the antenna gain differently depending on the direction. Using the beam forming antenna, on the side of the transmitter, the quality of the received signal of the receiver may be improved by forming a null so as not to radiate radio waves intensively by increasing the antenna gain in a certain direction, or not to radiate radio waves in a certain direction. In addition, on the side of the receiver, the quality of the wireless link may be improved by selectively receiving radio waves according to the receiving direction, increasing the desired signal, and reducing interference. Using the beam forming antenna, effects such as increasing capacity due to spatial reuse, removing interference between adjacent nodes using the same frequency, and increasing the distance range even with the same transmission power may be obtained.

The above description is information the inventor(s) acquired during the course of conceiving the present disclosure, or already possessed at the time, and is not necessarily art publicly known before the present application was filed.

SUMMARY

A mobile communication system based on terahertz frequency has a fractional bandwidth of 15% with a bandwidth of 23 GHz and a significant path loss. Accordingly, a technology for compensating for path loss and designing a wideband beam forming antenna device for transmitting and receiving a signal in the terahertz frequency band is required.

Various embodiments are applied to a terahertz based mobile communication system and provide a wideband beam forming antenna device for a gain increase while supporting a wideband bandwidth (e.g., a bandwidth of 23 GHz).

However, the technical aspects are not limited to the aforementioned aspects, and other technical aspects may be present.

According to various embodiments, a wideband antenna used for mobile communication in a terahertz wave communication band may include an antenna board including a first surface and a second surface opposite to the first surface, and a plurality of dipole antennas arranged on the antenna board, each of the plurality of dipole antennas may include a feeder disposed on the first surface and a radiator disposed on the second surface and physically spaced apart from the feeder, the feeder may be wire-bonded to a corresponding channel of a plurality of channels of a beam former, and the radiator may be coupled to the feeder to receive a signal from the feeder.

The feeder may have the same length for each of the dipole antennas.

The radiator may include a first left line and a first right line symmetrical to the first left line, and any one of the first left line and the first right line may be coupled to the feeder to receive the signal.

The antenna board may be a low-loss Teflon substrate.

The plurality of dipole antennas may be arranged on the antenna board at uniform intervals, and the radiator may have the same length and size for each of the dipole antennas.

According to various embodiments, a wideband beam forming antenna device used for mobile communication in a terahertz wave communication band may include M layers including N beamforming antenna unit modules, the beam forming antenna unit module may include a beam former including K channels and a wideband antenna wire-bonded with the beam former, and the N, M, and K may be natural numbers greater than 1, and the wideband beam forming antenna device may be composed of an M×N×K channel.

The wideband antenna may include an antenna board including a first surface and a second surface opposite to the first surface and K dipole antennas arranged on the antenna board, each of the K dipole antennas may include a feeder disposed on the first surface and a radiator disposed on the second surface and physically spaced apart from the feeder, the feeder may be wire-bonded to a corresponding channel of K channels of the beam former, and the radiator may be coupled to the feeder to receive a signal from the feeder.

The feeder may have the same length for each of the dipole antennas.

The radiator may include a first left line and a first right line symmetrical to the first left line, and any one of the first left line and the first right line may be coupled to the feeder to receive the signal.

The antenna board may be a low-loss Teflon substrate.

The plurality of dipole antennas may be arranged on the antenna board at uniform intervals, and the radiator may have the same length and size for each of the dipole antennas.

According to various embodiments, a method of designing a wideband antenna used for mobile communication in a terahertz wave communication band may include an operation placing a beam former in a stacked structure of a carrier and a main board, an operation of arranging a plurality of dipole antennas on an antenna board including a first surface and a second surface opposite to the first surface, and an operation of wire bonding of each of the plurality of dipole antennas to a corresponding channel of a plurality of channels of the beam former, each of the plurality of dipole antennas may include a feeder disposed on the first surface and a radiator disposed on the second surface and physically spaced apart from the feeder, the feeder may be wire-bonded to a corresponding channel of a plurality of channels of the beam former, and the radiator may be coupled to the feeder to receive a signal from the feeder.

The feeder may have the same length for each of the dipole antennas.

The radiator may include a first left line and a first right line symmetrical to the first left line, and any one of the first left line and the first right line may be coupled to the feeder to receive the signal.

The antenna board may be a low-loss Teflon substrate.

The plurality of dipole antennas may be arranged on the antenna board at uniform intervals, and the radiator may have the same length and size for each of the dipole antennas.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
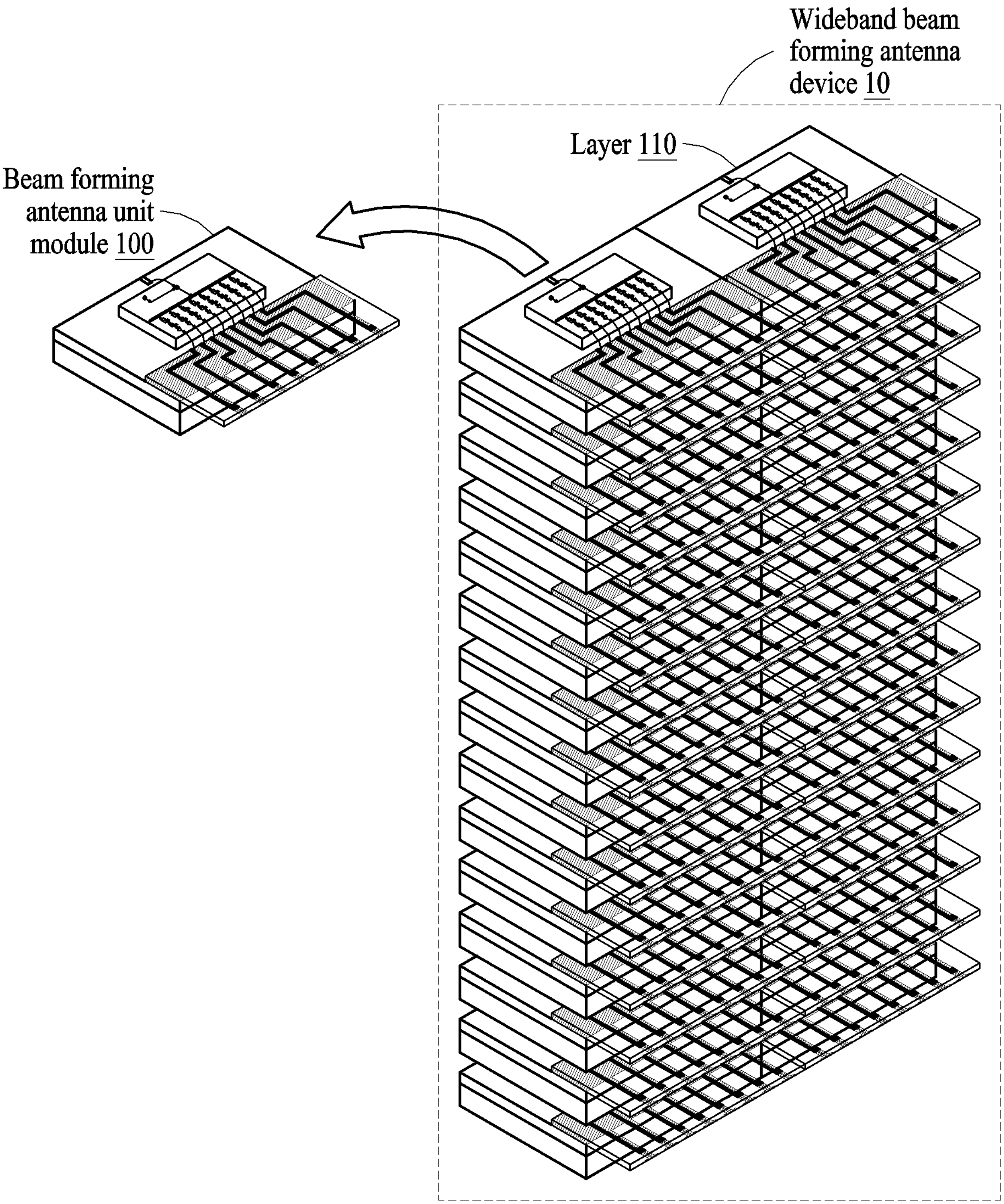
FIG. 1 is a diagram illustrating a wideband beam forming antenna device according to various embodiments.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like elements and a repeated description related thereto will be omitted.

FIG. 1 is a diagram illustrating a wideband beam forming antenna device according to various embodiments.

Referring to FIG. 1, according to various embodiments, the wideband beam forming antenna device 10 may be located at the most front end of a mobile communication system (e.g., a terahertz system) using a terahertz frequency band and may be a wideband antenna device for achieving a gain increase due to wideband transmission and beam forming. The wideband beam forming antenna device 10 may include a plurality of layers 110 including one or more beam forming antenna unit modules 100. The beam forming antenna unit module 100 may be a unit module constituting the wideband beam forming antenna device 10. For example, the wideband beam forming antenna device 10 may include M (e.g., M is a natural number greater than 1, and may be 16) layers 110 including N (e.g., N is a natural number greater than 1, and may be 2) beam forming antenna unit modules 100.

According to various embodiments, each beam forming antenna unit module 100 may include K (e.g., K is a natural number greater than 1 and may be 8) beam formers and antennas. When N is 2, M is 16, and K is 8, and the wideband beam forming antenna device 10 may include 32 beam forming antenna unit modules 100 and may be configured with a total of 256 channels. The terahertz system may require wideband transmission technology because it has a fractional bandwidth of 15% with a bandwidth of 23 GHz, and the wideband beam forming antenna device 10 according to various embodiments may configure the wideband beam forming antenna unit module 100 of 8 channels, and then use it to configure 32 modules and a total of 256 channels, thereby increasing signal gain and making it capable of wideband transmission.

Figure 2:
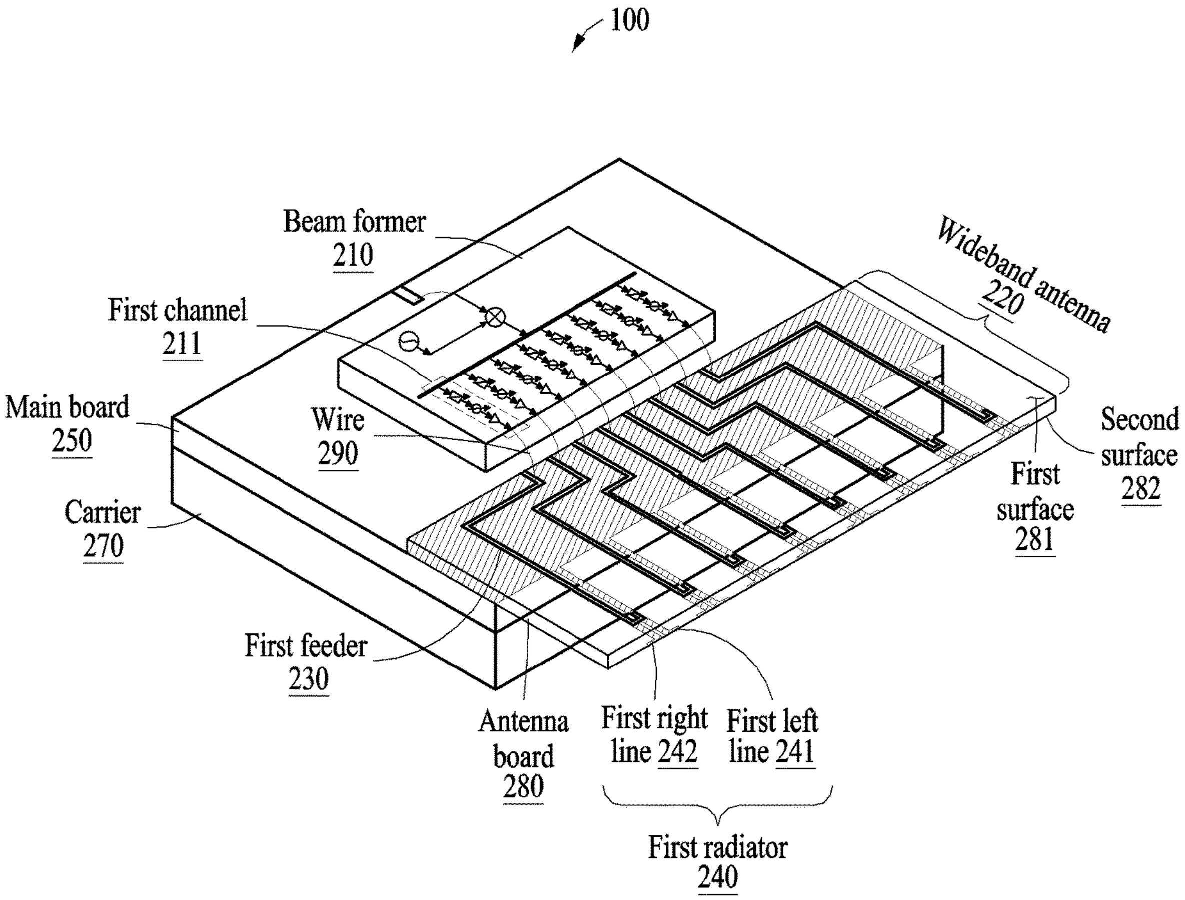
FIG. 2 is a diagram illustrating a beam forming antenna unit module according to various embodiments.

FIG. 2 is a diagram illustrating a beam forming antenna unit module according to various embodiments.

Referring to FIG. 2, the beamforming antenna unit module 100 may include a beam former (e.g., an 8-channel beam former) 210, a wideband antenna 220, a main board 250, a carrier 270, and a wire 290. The beam former 210 and the wideband antenna 220 may be located on the main board 250 and the carrier 270. The main board 250 may be composed of a low-loss Teflon substrate (e.g., a low-loss Teflon substrate having a thickness of 0.127 mm) and the carrier 270 may include a metal material.

According to various embodiments, the beam former 210 may perform a function of converting an intermediate frequency (IF) signal into a radio frequency (RF) signal and changing an amplification and a phase of a signal. The beam former 210 may include a signal generator, a signal converter, an amplifier, and a phase shifter.

According to various embodiments, the wideband antenna 220 may include a plurality (e.g., 8) dipole antennas and an antenna board 280. The plurality of dipole antennas may include a feeder and a radiator including a pair of left and right lines. For example, a first dipole antenna may include a first feeder 230, a first radiator 240 including a first left line 241 and a first right line 242. The plurality of dipole antennas may be arranged on the antenna board 280 at uniform intervals.

According to various embodiments, the antenna board 280 may include a first surface 281 (e.g., an upper surface) and a second surface 282 (e.g., a lower surface) opposite to the first surface. The antenna board 280 may be composed of a low-loss Teflon substrate. A dielectric material of the antenna board 280 may serve as an inductor or a capacitor between the feeder and the radiator.

According to various embodiments, the feeder may be disposed on the first surface 281. All feeders of the wideband antenna 220 may be arranged at uniform intervals on the first surface 281. The feeder may be bonded with a wire 290 to a corresponding channel of a plurality of channels of the beam former 210 to receive a signal from the beam former 210. The wire 290 may be gold. For example, the first feeder 230 may be bonded with a wire 290 to a first channel corresponding to the first feeder 230.

According to various embodiments, the feeder is not circuit-connected on a plurality of channels of the beam former 210 disposed on the lower surface of the beam former 210 and on the main board 250, but wire-bonded to a plurality of channels of the beam former 210 disposed on an upper layer surface of the beam former 210, so that it is simple to implement wideband for a terahertz system.

According to various embodiments, the feeder may have different patterns to have the same length for each dipole antenna. Since the feeder has the same length for each dipole antenna, the speed of signal transmission on all the feeders of the wideband antenna 220 may be the same.

According to various embodiments, the radiator may be disposed on the second surface 282 and physically spaced apart from the feeder. All radiators of the wideband antenna 220 may be arranged at uniform intervals on the second surface 282. The radiator may be coupled to the feeder based on the dielectric material of the antenna board 280 to receive a signal from the feeder. The radiator may include a left line and a right line symmetrical to the left line, and one of the left line and right line may be coupled to the feeder to receive a signal from the feeder. For example, the first radiator 240 may include a first left line 241 and a first right line 242 symmetrical to the first left line 241, and one of the first left line 241 and first right line 242 may be coupled to the first feeder 230 to receive a signal from the first feeder 230. The radiator may have the same length and size for each dipole antenna.

According to various embodiments, the wideband antenna 220 may arrange a plurality of dipole antennas on one antenna board 280, wire-bond the feeder to a corresponding channel of a plurality of channels of the beam former 210, and increase the signal gain while implementing the wideband for a terahertz system by transmitting and receiving a signal through coupling between the feeder and the radiator.

Figure 3:
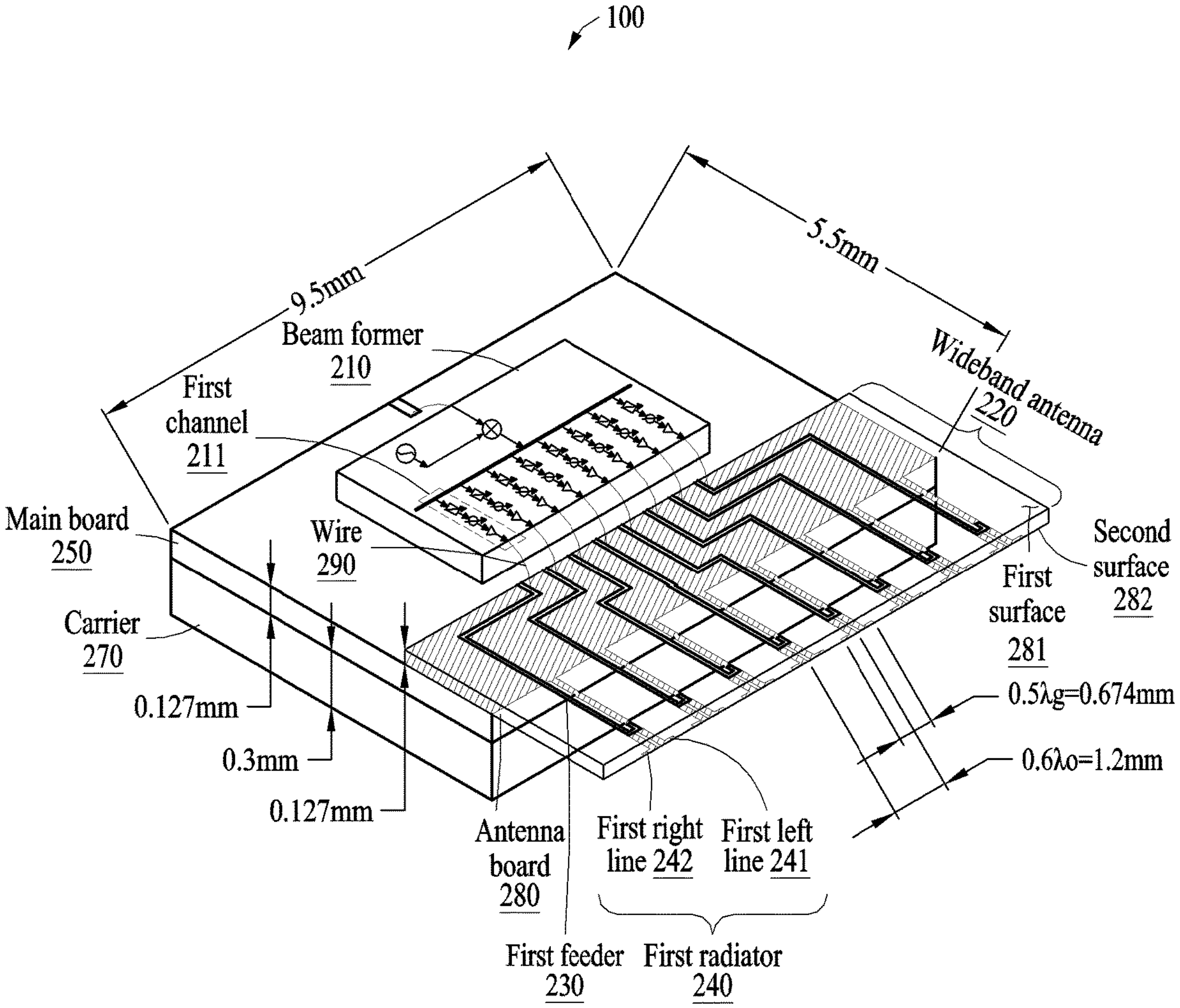
FIG. 3 is a diagram illustrating an example embodiment of a beam forming antenna unit module according to various embodiments.

FIG. 3 is a diagram illustrating an example embodiment of a beam forming antenna unit module according to various embodiments.

Referring to FIG. 3, according to various embodiments, the beam forming antenna unit module 100 may be optimized for implementing a wideband width by size information described below when the center frequency is 153 GHz.

For example, the horizontal length of the main board 250 and the carrier 270 may be 5.5 mm, and the vertical length may be 9.5 mm. The main board 250 may be implemented with a low-loss Teflon substrate having a thickness of 0.127 mm, the carrier 270 may be implemented with a low-loss Teflon substrate having a thickness of 0.3 mm, and the antenna board 280 may be implemented with a low-loss Teflon substrate having a thickness of 0.127 mm. The beam former 210 is an 8-channel beam former including a signal generator, a signal converter, an amplifier, and a phase shifter, and may be connected to the wideband antenna 220 by bonding with a wire 290. There are a total of 8 dipole antennas. The size of the radiator for each dipole antenna may be 0.5 $\lambda g$=0.674 mm, and the interval between dipole antennas may be 0.6 $\lambda o$=1.2 mm.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A wideband antenna used for mobile communication in a terahertz wave communication band, comprising:

an antenna board comprising a first surface and a second surface opposite to the first surface; and a plurality of dipole antennas arranged on the antenna board, wherein each of the plurality of dipole antennas comprises:

a feeder disposed on the first surface; and a radiator disposed on the second surface and physically spaced apart from the feeder, wherein the feeder is directly wire-bonded to a corresponding channel of a plurality of channels of a beam former, and wherein the radiator is configured to couple to the feeder to receive a signal from the feeder.

2. The wideband antenna of claim 1, wherein the feeder has a same length for each of the dipole antennas.

3. The wideband antenna of claim 1, wherein the radiator comprises:

a first left line; and a first right line symmetrical to the first left line, wherein any one of the first left line and the first right line is configured to couple to the feeder to receive the signal.

4. The wideband antenna of claim 1, wherein the antenna board is a low-loss Teflon substrate.

5. The wideband antenna of claim 1, wherein the plurality of dipole antennas is arranged on the antenna board at uniform intervals, and wherein the radiator has the same length and size for each dipole antenna.

6. A wideband beam forming antenna device used for mobile communication in a terahertz wave communication band, comprising:

M layers comprising N beam forming antenna unit modules, wherein a beam forming antenna unit module comprises:

a beam former comprising K channels; and a wideband antenna wire-bonded to the beam former, wherein N, M, and K are natural numbers greater than 1, and wherein the wideband beam forming antenna device comprises an M×N×K channel;

wherein the wideband antenna comprises:

an antenna board comprising a first surface and second surface opposite to the first surface; and K dipole antennas arranged on the antenna board, wherein each of the K dipole antennas comprises:

a feeder disposed on the first surface; and a radiator disposed on the second surface and physically spaced apart from the feeder, wherein the feeder is directly wire-bonded to a corresponding channel of K channels of the beam former, and wherein the radiator is configured to couple to the feeder to receive a signal from the feeder.

7. The wideband beam forming antenna device of claim 6, wherein the feeder has a same length for each of the dipole antennas.

8. The wideband beam forming antenna device of claim 6, wherein the radiator comprises:

a first left line; and a first right line symmetrical to the first left line, wherein any one of the first left line and the first right line is configured to couple to the feeder to receive the signal.

9. The wideband beam forming antenna device of claim 6, wherein the antenna board is a low-loss Teflon substrate.

10. The wideband beam forming antenna device of claim 6, wherein the plurality of dipole antennas is arranged at uniform intervals on the antenna board, and wherein the radiator has a same length and size for each dipole antenna.

11. A method of designing the wideband antenna used for mobile communication in a terahertz wave communication band, comprising:

an operation of placing the beam former in a stacked structure of a carrier and a main board;

an operation of arranging a plurality of dipole antennas on an antenna board comprising a first surface and a second surface opposite to the first surface; and an operation of wire-bonding each of the plurality of dipole antennas to a corresponding channel of a plurality of channels of the beam former, wherein each of the plurality of dipole antennas comprises:

a feeder placed on the first face; and a radiator disposed on the second surface and physically spaced apart from the feeder, wherein the feeder is directly wire-bonded to a corresponding channel of a plurality of channels of the beam former, and wherein the radiator is configured to couple to the feeder to receive a signal from the feeder.

12. The method of designing of claim 11, wherein the feeder has a same length for each of the dipole antennas.

13. The method of designing of claim 11, wherein the radiator comprises:

a first left line; and a first right line symmetrical to the first left line, wherein any one of the first left line and the first right line is coupled with the feeder to receive the signal.

14. The method of designing of claim 11, wherein the antenna board is a low loss Teflon substrate.

15. The method of designing of claim 11, wherein the plurality of dipole antennas is arranged at uniform intervals on the antenna board, and wherein the radiator has a same length and size for each dipole antenna.

* * * * *